Dec. 20, 1966  W. E. SCHMIDT  3,292,712
ROTOR HEAD
Filed April 29, 1965
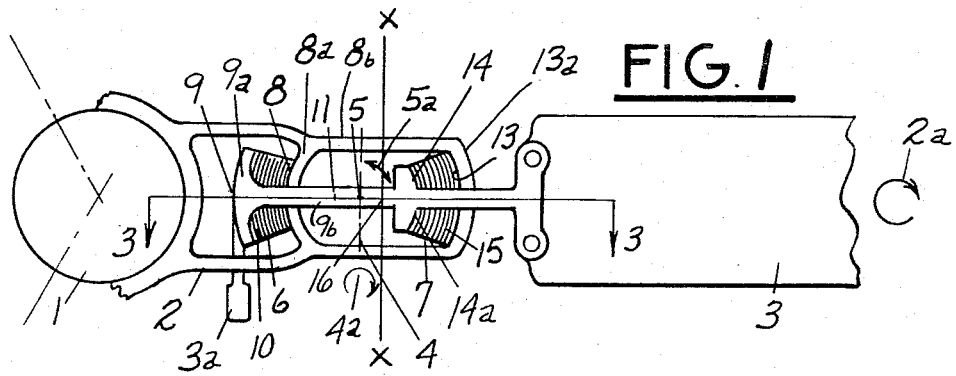
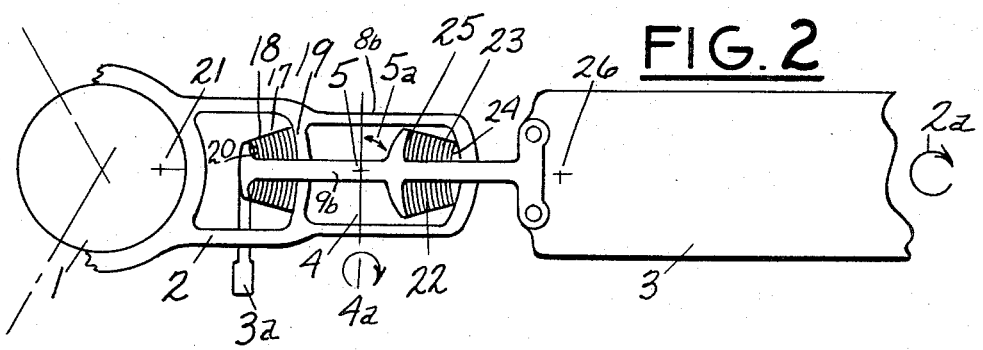
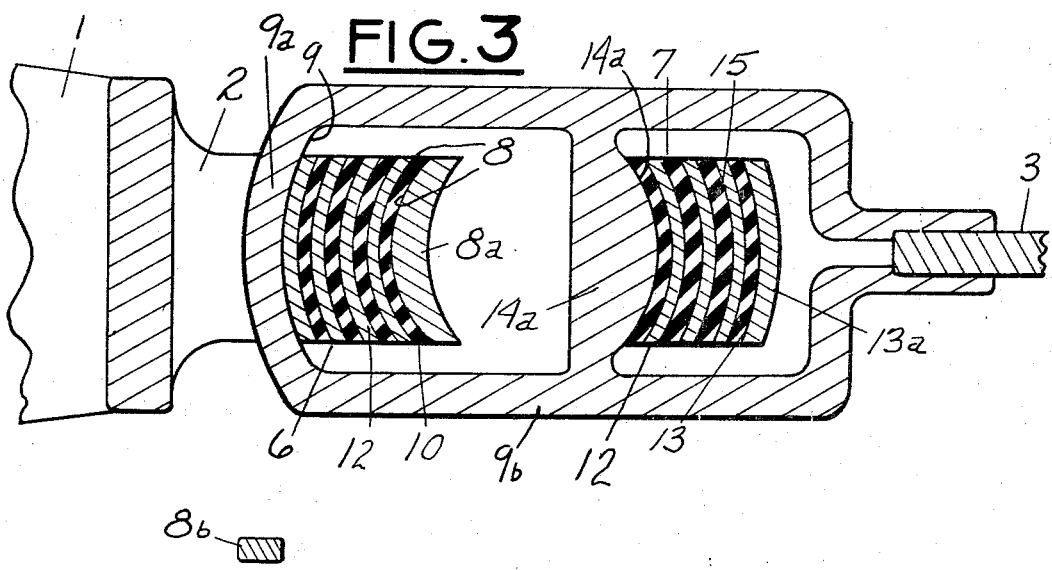
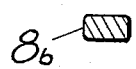
INVENTOR.
Warren E. Schmidt
BY Ralph Hammar
Attorney

United States Patent Office 3,292,712
Patented Dec. 20, 1966

3,292,712
ROTOR HEAD
Warren E. Schmidt, Erie, Pa., assignor to Lord Corporation, Erie, Pa., a corporation of Pennsylvania
Filed Apr. 29, 1965, Ser. No. 451,814
4 Claims. (Cl. 170—160.53)

This invention improves the rotor heads of Patents 3,106,965 and 3,111,172 by decreasing the torsional stiffness or spring rate required for blade pitch change and by permitting a wider range of spring rates for the lead lag and flapping motions of the blades. The structure also reduces the air drag and permits shifting of the pivot point for the lead lag and flapping modes by changing the relative stiffness of the joints.

In the drawing, FIG. 1 is a top plan view of a helicopter rotor head, FIG. 2 is a top plan view of the modification of the helicopter rotor head, FIG. 3 is a section on line 3—3 of FIG. 1, and FIG. 4 is a section on line X—X of FIG. 1.

In the drawing, 1 indicates the helicopter rotor shaft hub having a plurality of radially projecting arms 2, each of which carries a blade 3 coaxial with the arm. The rotor shaft is driven by the usual transmission. Associated with each of the blades is a pitch control linkage driven at the same speed as the rotor and having an arm 3a for rotating the blade about its longitudinal axis to vary its pitch. In addition to rotation about its axis, each of the blades may have a flapping motion about an axis 4 in a horizontal plane through the associated arm 2 and a lead lag or drag motion about a vertical axis 5 in a vertical plane through the arm. The flapping motion about the axis 4 is indicated by the arrow 4a. The lead lag motion about the axis 5 is indicated by the arrow 5a and the pitch change motion about the axis of the arm 2 is indicated by the arrow 2a.

The connection between the blade and arm providing for the required motions comprises two sandwich joints 6 and 7 spaced along and transverse to the longitudinal axis of the blade. The joint 6 comprises a member 8a having a spherical surface 8 fixed to the arm 2 and presented toward the rotor shaft, a member 9a having a spherical surface 9 presented toward and fixed to the blade 3, and a body 10 of elastomer sandwiched between and bonded to the surfaces 8 and 9. The surfaces 8 and 9 are preferably spherical and centered on the point 11. It is not essential that the surfaces 8 and 9 be spherical or that the surfaces be centered on the same point. It is, however, essential that the surfaces 8 and 9 be transverse to the longitudinal axis of the blade so that the centrifugal load is taken in compression by the body 10 of elastomer. To increase the stiffness of the elastomer under compression loads, a plurality of shims or plates 12 of metal or other suitable non extensible material are spaced throughout and bonded to the body transverse to the centrifugal load. The shims 12 prevent buldging of the body 10 under compression load and thereby increase in stiffness. The shims do not vary the stiffness of the body 10 in shear and accordingly do not affect the resilience of the joint for the torsional or pitch change motion. The shims do greatly increase the stiffness of the joint so far as the centrifugal load is concerned.

The joint 7 comprises a member 13a having a sperical surface 13 fixed to the arm 2 and presented toward the rotor shaft, a member 14a having a spherical surface 14 fixed to and presented toward the blade 3, and a body 15 of elastomer sandwiched between and bonded to the surfaces 13 and 14. The body 15 is provided with shims 12 to increase the stiffness of the joint under centrifugal load without affecting the stiffness of the joint in shear. Preferably, the surfaces 13 and 14 are spherical and are centered at point 16. The joint 7 is similar in construction to the joint 6.

The joints 6 and 7 are connected in parallel so as to divide the centrifugal force load of the blade 3, thus reducing the outside diameter of the mountings required for the same compression stress in the elastomer. The members 8a and 13a are connected by struts 8b spaced radially outward from and angularly about the axis of the blade and the members 9a and 14a are similarly connected by struts 9b spaced radially outward from and angularly about the axis of the blade and angularly from the struts 8b. Due to the reduced diameter of the joints, the air drag load is reduced and also the torsional stiffness for the pitch change motion of the blade in the direction of arrow 2a is approximately halved for the same centrifugal load capacity because the torsional spring rate is a function of the square of the joint radius. By dividing the centrifugal load between two joints, the effort required to change the pitch of the blade is reduced to half that required for comparable constructions where the entire centrifugal load is carried by a single joint.

The stiffness in the flapping direction indicated by arrow 4a and in the lead lag direction indicated by arrow 5a is controlled by the distance between the joints 6 and 7 and by the distance between the focal points 11 and 16, both of which can be changed without affecting the torsional stiffness in the direction of arrow 2a. If the focal points 11 and 16 coincide, the stiffness of the joints in the flapping motion indicated by arrow 4a and in the lead lag motion indicated by arrow 5a are at a relative minimum since these motions are accommodated by shear of the elastomer. When the focal points 11 and 16 are slightly separated as shown in FIG. 1, motion in the direction of arrows 4a and 5a results in some compression of the elastomer with a resultant increase in stiffness. The differential in stiffness about the axes 4 and 5 can be further varied by changing the radius of curvature and the extent of the surfaces 8, 9 and 13, 14. When the curvature and extent of the surfaces is such as to introduce a large compression component, the joints become quite stiff in the flapping and lead lag directions and approach the rigid rotor concept.

Another possibility is to make one of the pair of joints 6, 7 stiffer than the other either by making the joints unequal in size or of materials having unequal spring rates. The joints are in parallel and, therefore, divide the centrifugal and blade forces in proportion to their spring rates. Unequal spring rates of the joints shift the resultant nodal point toward the stiffer joint. This is advantageous since many helicopter designers prefer that the effective pivot point of the blade be as far outboard from the rotor shaft as is practical. This can be accomplished by making the joint 7 relatively stiffer than the joint 6.

In the modification of FIG. 2, the elastomeric joints are of substantially the same construction as in FIG. 1 but are arranged convex to each other rather than concave to each other as shown in FIG. 1. That is, the joint surfaces are concentric about points displaced outwardly from each other rather than about points in the space between the joints. Corresponding parts are indicated by the same reference numerals.

In this modification, the joint 17, which corresponds to the joint 6, is an elastomeric sandwich having a body 18 of elastomer sandwiched between and bonded to a spherical surface 19 on the arm 2 presented to the rotor shaft and a spherical surface 20 presented to and connected to the blade 3. The surfaces 19 and 20 are centered on a point 21. The joint 22, which corresponds to the joint 7, has a body 23 of elastomer sandwiched between and bonded to a spherical surface 24 on the arm 2 presented toward the rotor shaft and a spherical surface 25 presented to and connected to the blade 3, the surfaces 24 and 25 being concentric centered on point 26. As in the FIG. 1 construction, spherical shims of inextensible material are embedded in and bonded to the elastomer to restrain bulging under compressive load and thereby increase the stiffness of the joints in the axial direction or along the axis of the blade. Because the surfaces 19, 20 of joint 17 are convex with respect to the corresponding surfaces 25, 24 of the other joint 22, a considerable compression component is introduced restraining rotation about the axes 4 and 5. This means that the stiffness in the lead lag and flap directions are very high, at least ten times as stiff as in the FIG. 1 construction, and of the order of one hundred times as stiff as the structures of Patents 3,106,965 and 3,111,172. While the lead lag and flap stiffness is increased, the torsional or pitch change spring rate is still very low since this motion stresses the elastomer in shear.

When the joints 6 and 7 of the FIG. 1 rotor head are centered at the intersection of axes 4 and 5, the pitch change lead lag, and flapping spring rates are a minimum. The lead lag and flapping spring rates are increased by moving the joints 6 and 7 apart along the blade axis, by changing the radius of curvature of the joint surfaces, and by making the surfaces of one joint convex to the corresponding surfaces of the other joint as in FIG. 2. The shear pitch change spring rate is changed by varying the size of the bodies of elastomer between the joint surfaces. The compression or centrifugal load spring rate is changed by modifying the structure for resisting bulging of the elastomer under compression load.

What is claimed as new is:

1. A rotor for helicopters and the like having a hub with a plurality of radially extending arms, each arm being associated with a radially extending blade, a pair of joints adjacent the hub spaced from each other along the axis of the blade, each joint comprising a first member having a surface transverse to said axis and presented toward the hub, a second member having a surface transverse to said axis and presented toward the first surface and the blade, and a body of elastomer sandwiched between and fixed to said surfaces, first load carrying members spaced radially outward of said axis and angularly from each other about said axis and fixed to said first members of the joints and to said arm, second load carrying members spaced radially outward of said axis and angularly from each other about said axis and from the first load carrying members and fixed to said second members of the joints and to said blade whereby the bodies of elastomer sustain the centrifugal blade load in compression and the blade pitch change load in shear.

2. The rotor of claim 1 in which the surfaces of the first and second members of each joint are substantially concentric spherical surfaces.

3. The rotor of claim 2 having two joints associated with each blade with the spherical surfaces of one joint concave toward the corresponding surfaces of the other joint.

4. The rotor of claim 2 having two joints associated with each blade with the spherical surfaces of one joint convex toward the corresponding surfaces of the other joint.

References Cited by the Examiner

UNITED STATES PATENTS

| 1,921,931 | 8/1933 | Levasseur | 170—160.53 |
| 2,471,578 | 5/1949 | Moore | 170—160.52 |
| 3,106,965 | 10/1963 | Gorndt et al. | 170—160.53 |

FOREIGN PATENTS

| 934,336 | 1/1948 | France. | |

MARTIN P. SCHWADRON, *Primary Examiner.*

EVERETTE A. POWELL, JR., *Examiner.*